Sept. 27, 1938.  W. F. OCENASEK  2,131,492
TILTING ARBOR TABLE SAW
Filed Nov. 28, 1936  4 Sheets-Sheet 1

INVENTOR
William Ferdinand Ocenasek
BY
Albert F. Nathan
ATTORNEY

Sept. 27, 1938.   W. F. OCENASEK   2,131,492
TILTING ARBOR TABLE SAW
Filed Nov. 28, 1936   4 Sheets-Sheet 2
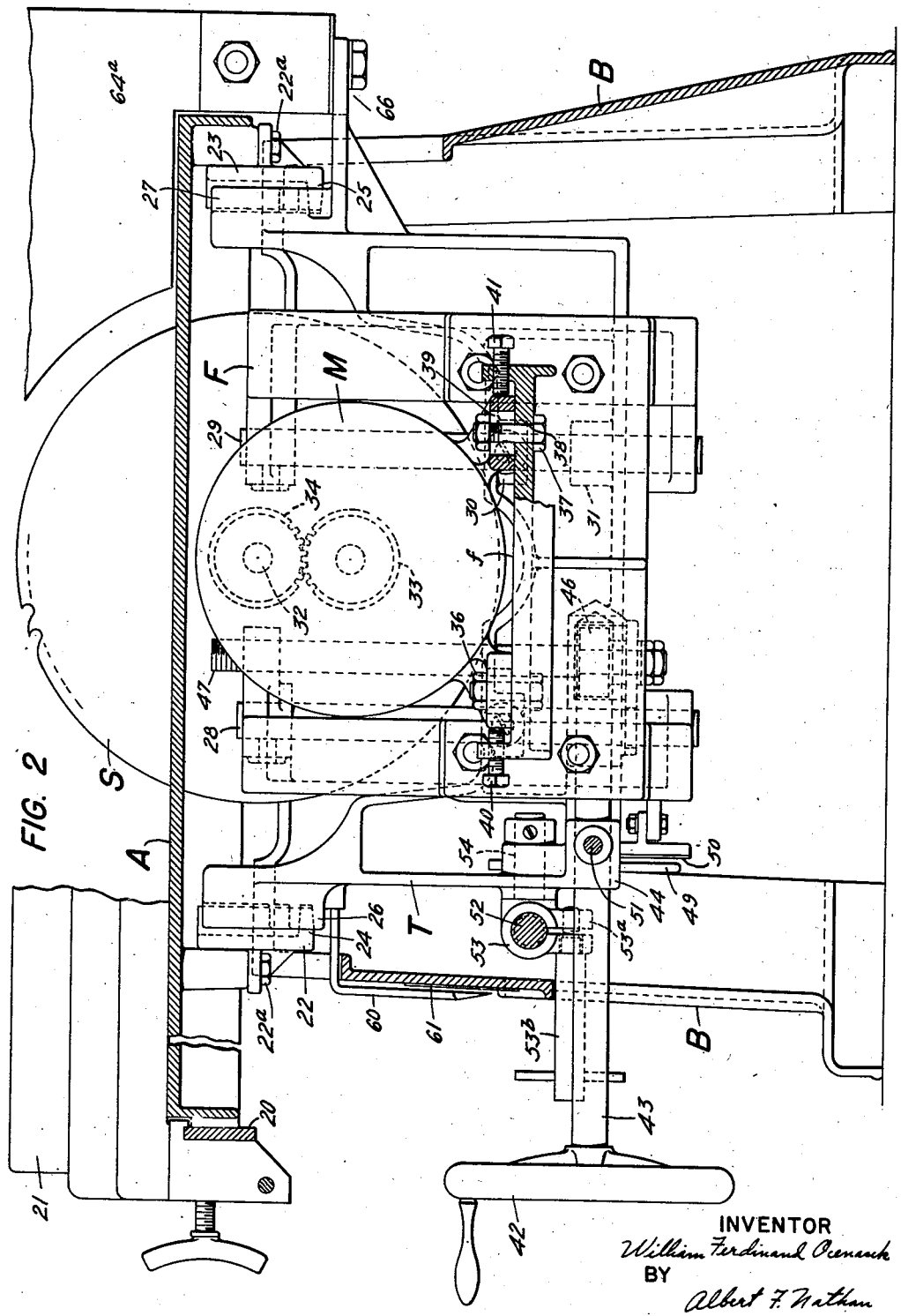
INVENTOR
William Ferdinand Ocenasek
BY
Albert F. Nathan
ATTORNEY

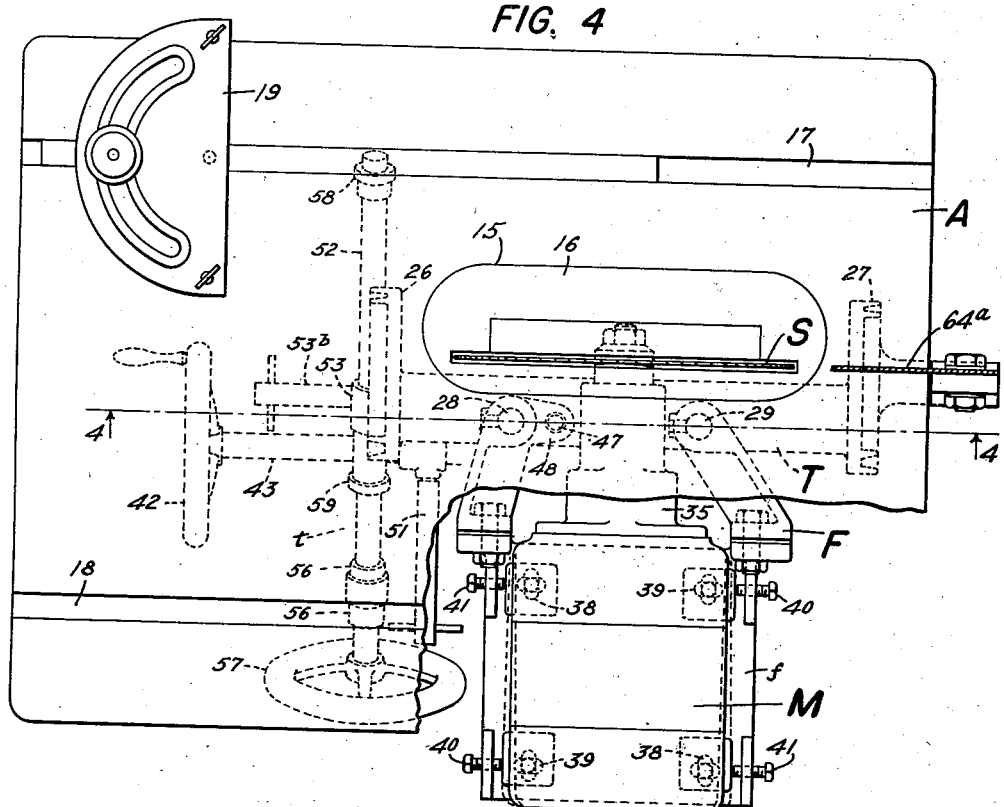
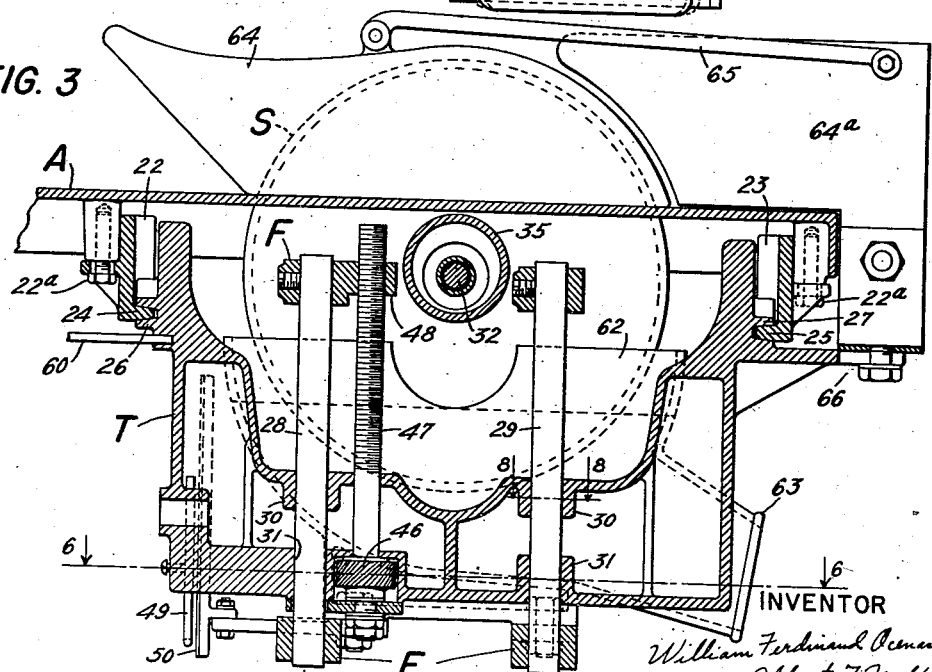

Sept. 27, 1938.   W. F. OCENASEK   2,131,492
TILTING ARBOR TABLE SAW
Filed Nov. 28, 1936   4 Sheets-Sheet 4
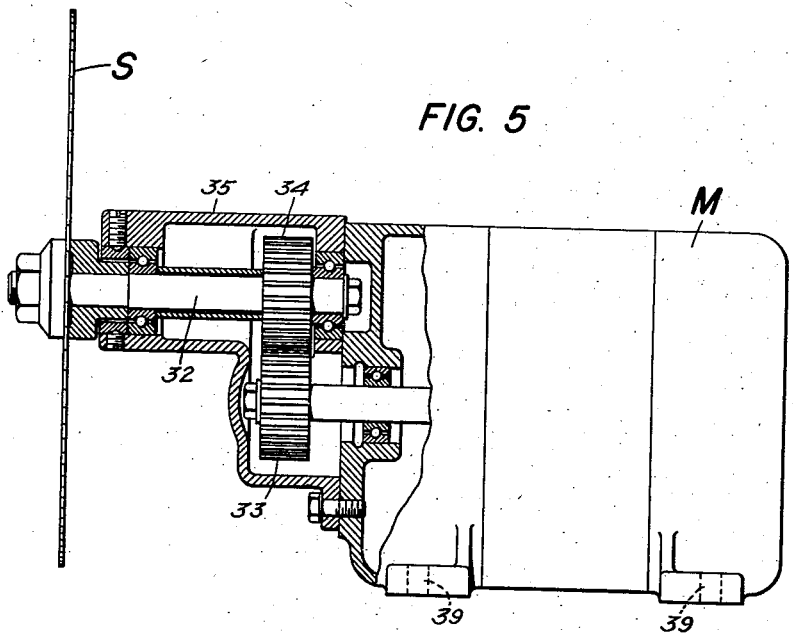
FIG. 5
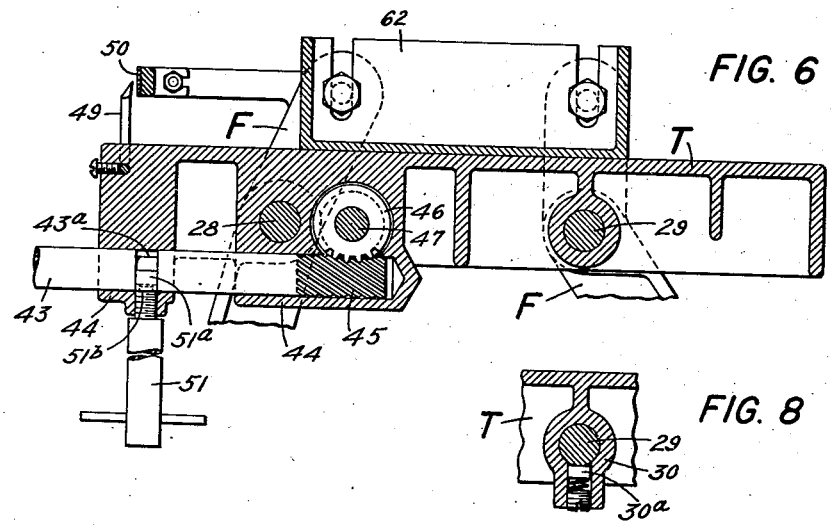
FIG. 6
FIG. 8
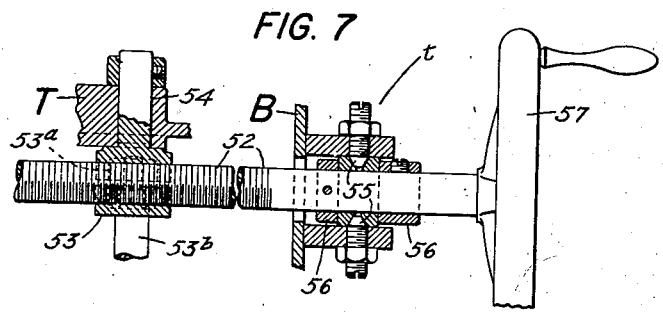
FIG. 7
INVENTOR
William Ferdinand Ocenasek
BY
Albert F. Nathan
ATTORNEY Patented Sept. 27, 1938

2,131,492

UNITED STATES PATENT OFFICE 2,131,492

TILTING ARBOR TABLE SAW

William Ferdinand Ocenasek, Plainfield, N. J., assignor to Walker-Turner Company, Inc., Plainfield, N. J., a corporation of New York Application November 28, 1936, Serial No. 113,139

10 Claims. (Cl. 143—6)

The present invention relates to power saw machines and particularly to an improved means for adjusting the relation between the saw and the work supporting surface of the table to obtain proper alignment, depth, and angle of cut.

A primary aim of the invention is to render a power saw available in which the saw and its driving means are capable of adjustment laterally in the general direction of the axis of the saw, and also angularly about an axis perpendicular thereto, whereby the plane of the saw may be shifted relative to the slot in the table and/or aligned therein with respect to the sides of the slot or the guideways on the table.

A further object of the invention is to provide a power saw in which the angular relation of the plane of the saw to the plane of the table may be adjusted to suit the requirements of the user, and also a saw in which the power unit is capable of pivotal adjustment relative to the table to align or to locate the plane of the saw in a predetermined position with respect to the axis of tilting movements. Adjustments of the above character are frequently necessary not only in initially assembling the machine tool, but subsequently during normal use of the machine in restoring and maintaining the original alignment, and the present invention aims to accomplish those ends in a simple effective manner.

The invention further aims to provide a power saw in which means are provided for conveniently and expeditiously raising or lowering of the saw in any of its tilted or laterally adjusted positions, so that workpieces of various thicknesses may be efficiently handled and the correct angle of cut assured.

Another objective of this invention is to eliminate the heretofore conventional pulley and belt drives and to render available a more powerful and efficient direct drive that admits of the saw being set to its maximum depth of cut in any position to which it is normally capable of adjustment without disturbing the relation between the saw and its driver.

Still another objective of the invention is to provide an improved mounting for the saw and its driver and in which a combined saw guard and dust-chute is provided and maintained in a fixed relation to the saw in all of its angularly and vertically adjusted positions, thereby to avoid and entirely eliminate the danger of the saw striking the guard during the raising, lowering, or tilting movements.

Another important objective of this invention is to render available a power saw embodying one or more of the above mentioned features of adjustment, which may be quickly and easily assembled and thereafter conveniently adjusted and clamped by the operator in the position suited for the particular need.

In carrying out the objectives of this invention, it is proposed to arrange the saw arbor and the prime mover in a single compact housing with their axes in offset relation to one another, so as to yield a very powerful drive and be laterally and pivotally movable as a unitary assembly relative to a supporting frame member. The frame member, in turn, is slidable on a bracket that is pivoted to and underlies the table of the machine, and carries a combined dust-chute and guard for the saw. Movement of the saw assembly on the bracket toward or away from the table, in obtaining an adjustment for depth of cut, also effects bodily movement of the guard. Consequently, the tilting or changing of the relation between the plane of the saw and the plane of the table does not effect the relation between the dust-chute and saw and its drive assembly, and the danger of the saw ever striking the guard has been removed. Twisting of belts, sliding pulleys and other expedients and their attendant disadvantages, restorted to in the past have, by this invention, been eliminated.

For aligning the saw with respect to the slot in the table or with respect to the work-guides on the table, the present invention proposes a construction in which the entire drive assembly may be moved as a unit axially of the saw arbor and also about an axis perpendicular thereto. Hence, if in using the saw it is found that there is a tendency to bind or cramp the workpiece, the saw, arbor, and drive means may be conveniently adjusted angularly to place the saw in proper alignment with the guide. Likewise, if the user desires that the center line of the saw be positioned coincident with the axis of tilt or that the saw be positioned close to one side of the slot, which frequently is necessary in order that under support be given to thin strips, the entire assembly may be shifted axially without effecting the relation between the saw, arbor, and driver.

Other objects and advantages will be in part indicated in the following description and in part rendered apparent therefrom in connection with the annexed drawings.

To enable others killed in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 2 is a side view of the machine shown in Fig. 1, with portions of the table and leg frame broken away.

Fig. 3 is a longitudinal section of the machine taken along line 3—3 of Fig. 4.

Fig. 4 is a plan view illustrating more clearly the unitary mounting of the saw, arbor, and drive assembly.

Fig. 5 is a detail view of the drive assembly removed from the machine.

Fig. 6 is a horizontal section along line 6—6 of Fig. 3.

Fig. 7 is a sectional view of a preferred form of tilting and clamping mechanism.

Fig. 8 is a detail section through lines 8—8 of Fig. 3.

Figure 1:
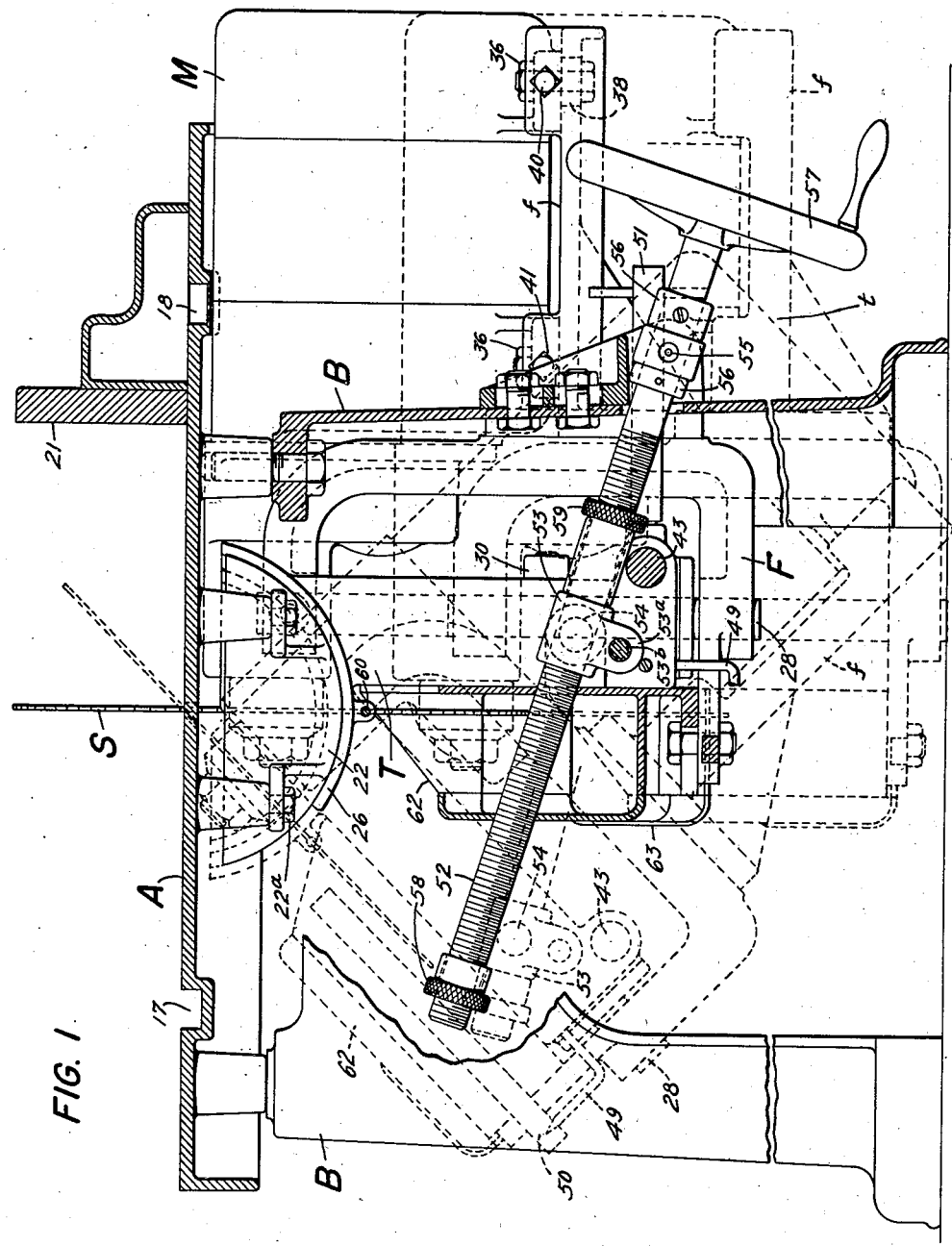
Figure 1 is a front view of the saw partly in section, illustrating the relation of the parts and a preferred form of mounting.

Referring more particularly to Figs. 1, 2 and 4, the invention is disclosed embodied in a bench saw of a preferred type for small work. In this figure, the table top A is preferably supported immovably on a leg frame B that may be mounted upon a work bench or stand at a convenient height. The table top is provided with an opening 15, within which a slotted insert 16 is fitted through which the saw S normally operates. The top is also grooved at 17 and 18 to provide guideways for crosscut or mitre guides 19, and is provided at its front edge with a perpendicular guide 20 for the laterally adjustable ripping fence 21. Normally, the guides 17, 18 and 20 must be respectively parallel and perpendicular to the plane of the saw to prevent cramping or binding of the saw in the workpiece. A serious difficulty heretofore encountered has been in obtaining and maintaining the correct relation between guides and saw, and which is now overcome by the present invention.

The support for the saw comprises two major elements, an adjustable frame member F and a tilting bracket T pivotally supported in trunnions 22 and 23 provided at the underside of the table. The trunnions 22 and 23 are each provided with tapered arcuate guide and supporting surfaces 24 and 25, the axis of which lies in the plane of the surface of the table and substantially coincident with the line of cut of the saw. Similar arcuate bearing surfaces 26 and 27 are provided at the upper end of the tilting bracket T.

The formation of the trunnions and their bearing surfaces is disclosed more clearly in Fig. 3, in which the angle of taper on the interfitting parts is approximately the 16° angle of a clutch tooth. This type of mounting may be made very accurately and when assembled affords a very firm bearing that resists radially acting forces in either direction. Any wear that is occasioned during use may be quickly taken up by loosening one of the trunnion blocks 22 and pressing it toward the other and reclamped in position. For this purpose at least one of the trunnion blocks 22 or 23 is provided with slotted openings through which the table clamp screws 22ª operate.

As illustrated more clearly in Figs. 1 and 3, the bracket T depends from the arcuate bearing surfaces 26 and 27, in offset relation to the plane of the saw, to provide ample clearance, and carries at its lateral side a vertically adjustable frame F on which is mounted the motor drive assembly. The frame F is firmly guided in its movements relative to the bracket by means of two shafts 28 and 29, located one at each side of the saw axis, supported in upper and lower bearings 30 and 31 provided by the bracket T. The upper bearings 30 are each provided with spring pressed wear bushings 30ª that function automatically to take up the wear and maintains the original alignment.

A powerful direct drive to the saw is obtained by directly coupling a motor M to the saw arbor 32. In this instance, the saw arbor is offset above the motor axis and connected therewith by gears 33 and 34. The housing 35 provides the journal bearings for the arbor and gearing and is bolted directly to the motor M, and with the motor, constitutes a unitary assembly.

The elevated position of the saw arbor with respect to the motor axis, enables the user to adjust the axis of the saw relatively close to the underside of the table and obtain a greater depth of cut and a more powerful drive than possible heretofore with the belt drives that were notably inefficient unless large pulleys were used.

For the purpose of aligning and shifting of the saw with relation to the guides on the table, the motor and arbor assembly is adjustably mounted upon a laterally extending shelf f of the supporting frame F. A convenient means for effecting the adjustments comprises bolts 36 and 37 which pass through elongated slots 38 in the frame and transverse slots 39 in the motor footing. By loosening the bolts 36 and 37, the motor assembly, including the gearing, saw arbor, and the saw may be adjusted as a unit, axially of the saw arbor or transversely thereto whereby the plane of the saw may be located precisely where required with respect to the saw slot and work guides. Delicate adjustments in aligning the saw are effected through the medium of screws 40 and 41. Adjustment of the sets of screws 40 and 41, pivots the drive assembly about a vertical axis.

In this way, adjustments are provided for shifting the saw and drive means as a unit laterally and about a vertical pivot and by means of which the plane of the saw may be located as to intersect the tilting axis and positioned definitely with respect to the slot or the work-guides. An adjustment of this character, it will be observed, overcomes the serious difficulty heretofore encountered in the mounting of saw arbors accurately with respect to the table, for now the table and saw elements may be constructed as units, placed in position and aligned with a high degree of accuracy. In using the machine for grooving or dadoing operations wherein a wide cutter or a plurality of cutters aggregating the thickness of the groove to be cut are employed, the saw and drive assembly may be shifted laterally as a unit to bring the center of the cutter head in coincidence with a given point on the work table, or if desired the centerline of a saw of a given thickness in coincidence with the axis of tilt.

After the foregoing adjustments have been made the entire assembly may be conveniently raised or lowered for depth of cut by a handwheel 42 accessible to the operator at the front of the machine. The handwheel 42 is keyed to a worm shaft 43 that is journaled in bearings 44 provided in the tilting bracket T and carries at its inner end a worm gear 45. The gear 45 meshes with a worm wheel 46 on a rotatable but non-translatable screw shaft 47. A nut 48 provided by the motor assembly frame F, operatively engages the screw shaft 47 and, as the latter is rotated by the handwheel, the motor frame and all parts supported thereby, is adjusted relative to the table top.

A pointer 49 and a cooperating adjustable scale 50, indicates the amount of adjustment imparted. When the pointer 50 is set in the proper position on the scale, having regard to the diameter of the saw mounted on the arbor, the gauge then indicates the amount that the saw projects above the table and the depth of cut it will take. When the saw has been adjusted to the proper height, it is locked in position by the hand clamp 51.

The clamp 51, also performs the function of restraining the worm shaft 43 against endwise movement and to accomplish that end, the clamp comprises a half-moon section 51$^a$ that fits in a shouldered groove 43$^a$ formed on the worm shaft. The moon-section 51$^a$ is recessed to receive the reduced end of the clamp shaft 51 and by means of which the section 51$^a$ is prevented from shifting axially or angularly. In turn, the section 51$^a$ restrains the worm shaft against axial movement in clamped and unclamped position.

Clamping of the worm shaft is, in this instance, effected by the shouldered end 51$^b$ of the clamp shaft pressing against the outer side of the half-moon section and thence transmitted to the worm shaft. No scoring of the worm shaft occurs as a result of the clamping pressure and the saw may be carefully adjusted and clamped in the particular position required.

To change the relation between the plane of the saw and the plane of the table, a self-locking tilting mechanism indicated generally by $t$, is provided. The tilting mechanism includes a rotatable screw shaft 52, and a relatively translatable nut 53, pivotally mounted to the respective parts between which the relative tilting movement occurs. In Figs. 1 and 7 of the drawings, the nut 53 is pivoted at 54 to the bracket T, whereas the screw shaft 52 is pivotally mounted, as at 55, in fixed relation to the table top, as for example, to the leg frame or other relatively stationary part. The shaft 52 is held against endwise movement relative its pivotal mounting by means of collars 56 and carries at its outer end a handwheel 57. At opposite sides of the nut 53, the screw shaft 52 is provided with adjustable stop collars 58 and 59 which are adapted to be set to limit the extremes of tilting movement to be effected.

As the handwheel 57 is actuated, the nut 53 moves therealong and carries the bracket T to the desired position. Inasmuch as the bracket T also supports the motor frame F and the complete motor assembly, a like angular movement is imparted to the saw. A pointer 60 and cooperating scale 61, are provided to facilitate obtaining any given angular relation, within the range of the machine, between the saw and the table.

The travelling nut 53 also provides the means for clamping the frame F in tilted position with respect to the table. This is effected by providing a laterally extending portion 53$^a$ on the nut, radially slotted as illustrated in Fig. 2 of the drawings. A clamp screw 53$^b$ threads into one of the split sections and shoulders against the other, and when the clamp screw is tightened, the nut is clamped to the shaft and the saw and pivoted frame F are clamped firmly in position.

A combined guard and dust-chute 62 is provided which encloses the lower peripheral edges of the saw and conducts the saw dust away from the slide bearings and to the rear of the machine. Referring more particularly to Figs. 1, 3 and 6, the combined guard and chute is illustrated attached to the motor frame F and is of such size as to accommodate the largest saw that normally would be mounted on the arbor. By mounting the chute directly to the motor frame, and movable bodily therewith, the radial distance between the saw axis and the chute remains constant. Consequently, as the saw is elevated or lowered to its extreme position, there is no danger of the teeth striking the guard. The same result follows when the saw is tilted, that is, the combined guard and chute moves bodily with the saw in all angularly adjusted positions. If desired the chute may be contoured, as at 63, to receive a flexible exhaust hose connection.

A saw guard 64 for that portion of the saw exposed above the table is preferably supported from the tilting bracket T, by means of an upright member 64$^a$ adjustably connected with the bracket at 66. The member 64$^a$ also functions as a splitter for spreading the saw cut slightly. The guard 64 is pivotally mounted to an overarm 65 and overlies and encloses the saw on three sides. In ripping stock in strips too narrow to permit use of the guard it may be lifted and swung out of the way. By mounting the splitter and guard on the tilting intermediate bracket T, the co-planar relation initially established by the lateral adjustment afforded at the connection 66, is maintained in all positions of angular adjustment of the saw.

From the foregoing, it will be seen that a very flexible yet sturdy power saw is provided, which may be inexpensively manufactured from standardized units and thereafter assembled with a high degree of accuracy. The cooperating pairs of elements of the machine have been so designed and constructed as to carry their respective adjusting mechanisms by means of which the relation of one major element to its coacting element may be adjusted independently of an adjustment or setting previously given to another pair. For example, the user may have adjusted the plane of the saw 36° from vertical, and find that he requires a little more or a little less depth of cut. The elevating handwheel 42 which moves with the bracket T may be actuated to obtain the required setting without effecting the angular position. Likewise, the entire motor assembly may be pivoted or shifted laterally on the motor frame F without disturbing the relation of the latter to the bracket T or table A.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. An adjustable power saw combining a work table having an opening therein; a saw projecting through said opening; a driving assembly for said saw comprising a saw arbor and a motor geared thereto; a slidable frame member for mounting said assembly; a supporting member for said frame pivoted to said table, the axis of said pivot being substantially coincident with the line of cut of the saw; means for adjusting said motor assembly laterally relative to said frame member to align said saw with the slot in the table; and manually operable means for adjusting the angular relation between the plane of the saw and the plane of the work table.

2. A power saw combining a table having a slot therein; a saw projecting through said slot; an arbor for the saw; a motor for driving said saw, said motor and saw arbor comprising a unitary assembly; a frame member for supporting said assembly; a bracket member pivoted to the table for supporting said frame; means for tilting said bracket member thereby to position the plane of said saw at an angle to the plane of the table; means for adjusting said frame relative to the bracket to cause said saw to project a given distance through the said slot; and means for adjusting said motor and arbor assembly laterally relative to said frame member to align the saw in said slot.

3. A power saw combining a table having a slot therein; a saw projecting through said slot; an arbor for the saw; a motor for driving said saw, said motor and saw arbor comprising a unitary assembly; a frame member for supporting said assembly; a bracket member for supporting said frame; means for tilting said bracket member relative to the plane of the said table thereby to position the plane of said saw at an angle to the plane of the table; and means for adjusting said motor and arbor assembly laterally relative to said bracket member to align the saw in said slot.

4. A tiltable support for a power saw combining a table member having a slot therein through which a saw projects; a saw supporting bracket member; means pivotally mounting said bracket member to the table member with the axis of said pivot lying in the plane of the table, comprising a pair of relatively adjustable trunnion elements secured to said table, each of said elements having formed thereon opposed arcuate bearing surfaces and at least one of said elements being adjustable toward and away from the other, said surfaces being mutually inclined from a plane concentric with the pivotal axis thereby forming wedge shaped bearing surfaces; complemental arcuate and generally wedge shaped bearing surfaces formed on said bracket member adapted to interengage with the bearing surfaces on said trunnion elements, the axis of curvature of all of said bearing surfaces lying in the plane of the table; and means for adjusting one of said trunnions toward the other to compensate for wear on said bearing surfaces incident to the tilting action of said supporting bracket.

5. A saw table having a slot therein, a circular saw operating through said slot; a mounting for said saw including an electric motor unit; means for adjusting said motor and saw assembly unit about transverse axes comprising a bracket member depending from and pivoted to said table with the axis of said pivot substantially coincident with the line of cut of the saw; said bracket having a laterally extending shelf portion; and means mounting the said motor and saw assembly unit on the shelf portion of said bracket for movement angularly relative thereto about an axis perpendicular to the plane of the shelf.

6. A power saw combining a table having a slot therein; an adjustable L-shaped frame member underlying said table; a tiltable support for the said frame; a unitary saw assembly mounted on the shelf of said L-shaped frame comprising a saw, an arbor therefor, and a motor for driving said arbor, the axis of said arbor and motor being offset from each other a fixed distance; means for adjusting said frame angularly about an axis coincident with the line of cut of the saw for inclining the plane of the saw with respect to the plane of the table; means for translating said L-shaped frame on said support in a straight line comprising a screw mechanism non-translatably mounted in said support with its free end extending past the axis of said arbor, and a nut mechanism carried by said frame adjacent the axis of said arbor, a worm gear for operating said screw mechanism, and a manually operable worm shaft journaled in said tiltable support and extending to the front of the machine for operating said worm gear; and a single means for clamping said worm shaft in an angularly adjusted position and for restraining axial movement thereof when unclamped.

7. A power saw combining four relatively movable major elements including a table having a slot therein; a bracket pivoted to the table, a frame slidable on the bracket electively toward or away from said table, and a self-contained electric saw adjustable on said frame; a support for one of said major elements; a manually operable shaft pivoted to said support and operatively connected with one of said pivoted major elements for tilting same to incline the saw relative to the table; a second shaft member journaled in one of said relatively slidable major elements and operatively connected with the other of said slidable elements for effecting relative sliding movements therebetween to raise or lower said saw; means for adjusting said electric saw unit laterally in transverse directions on said slidable frame for locating the axis of the saw and the plane of the saw in a predetermined position relative to the slot in the table; and means for clamping said major elements in their respective adjusted positions.

8. A power saw combining a table having a slot therein; an adjustable frame underlying said table; a saw assembly mounted on said frame comprising a saw, an arbor therefor, and a prime mover; means for adjusting said assembly relative to the table to cause said saw to project through the slot a predetermined distance, said means including a nut and screw mechanism operatively connected with said support and frame member, a worm gear for operating said mechanism, and a manually operable worm shaft for operating said worm gear; and means for clamping said assembly in adjusted position, comprising a non-translatable and non-rotatable element arranged in cooperative relation with a groove provided in said manually operable worm shaft; and screw means piloted in said element for urging said element into clamping relation with said manually operable shaft whereby said shaft is restrained against angular movement when clamped and restrained against endwise movement when unclamped.

9. A circular saw machine combining a saw table having a slot therein; a saw operating through said slot; drive means for said saw including a saw arbor and a prime mover assembly, the axes of said arbor and prime mover being offset a fixed distance from each other; a supporting bracket for said saw and prime mover normally maintained in fixed relation relative to said slot; manually operable means for selectively raising or lowering said bracket thereto to raise or lower said saw and prime mover assembly; and means for adjusting said assembly relative to the said supporting bracket about an axis perpendicular to the plane of the table and for shifting said assembly laterally relative to the said supporting bracket to locate the plane of said saw in a definite position with respect to the axis of said slot.

10. A power saw combining a table member having a slot therein adapted to accommodate a saw; a bracket member pivoted in a fixed position to said table; a tool slide mounted on said bracket and movable radially thereon selectively toward and away from the axis of said pivoted connection with said table; a saw and a saw arbor mounted on said tool slide in cooperative relation with the slot in said table; a combined guard and dust-chute carried by said slide in fixed spaced relation with the saw and movable bodily therewith toward or away from said pivot for guarding the lower peripheral edges of the saw; a splitter member carried by said pivoted bracket member extending around the rear end of the table and overlying said table in coplanar relation with said saw; means for adjusting the angular relation between the plane of the saw and the plane of the table without disturbing said coplanar relation between said saw and said splitter; and means for adjusting said slide and combined guard and dust-chute carried thereby on said bracket without disturbing the said spaced relation between the said saw and said combined guard and dust-chute.

WILLIAM FERDINAND OCENASEK.